United States Patent
Knapp

(12) 
(10) Patent No.: US 6,298,879 B1
(45) Date of Patent: Oct. 9, 2001

(54) STEM VALVE STOPPER

(75) Inventor: Francesco Knapp, Cava Manara (IT)

(73) Assignee: Masco Corporation of Indiana, Taylor, MI (US)

( * ) Notice: Subject to any disclaimer, the term of this patent is extended or adjusted under 35 U.S.C. 154(b) by 0 days.

(21) Appl. No.: 09/530,064

(22) PCT Filed: Oct. 20, 1998

(86) PCT No.: PCT/US98/22099

§ 371 Date: Apr. 20, 2000

§ 102(e) Date: Apr. 20, 2000

(87) PCT Pub. No.: WO99/20926

PCT Pub. Date: Apr. 29, 1999

(30) Foreign Application Priority Data

Oct. 21, 1997 (IT) ............................................. TO97A0919

(51) Int. Cl.[7] .................................................. F16K 31/00
(52) U.S. Cl. ................ 137/625.31; 137/625.33; 251/121; 251/158; 251/159; 251/174; 251/205; 251/267
(58) Field of Search .................................... 251/205, 174, 251/267, 158, 159, 121; 137/625.33, 625.31

(56) References Cited

U.S. PATENT DOCUMENTS

| 2,204,191 | 6/1940 | Sloan et al. . |
| 2,649,273 | * 8/1953 | Honegger ................................ 251/27 |
| 2,770,443 | 11/1956 | Rand . |
| 3,006,361 | 10/1961 | Reinemann . |
| 3,913,612 | 10/1975 | Tolnai . |
| 4,058,289 | 11/1977 | Hicks . |
| 4,175,586 | 11/1979 | Hayma . |
| 4,493,338 | 1/1985 | Petursson . |
| 5,107,884 | * 4/1992 | Orlandi .............................. 137/454.5 |
| 5,348,042 | * 9/1994 | Wagner et al. ....................... 137/237 |
| 5,580,031 | * 12/1996 | Lorch .................................. 251/174 |

FOREIGN PATENT DOCUMENTS

| 94 18 554 U | 11/1994 | (DE) . |
| 0 606 419 B1 | 6/1993 | (EP) . |
| PCT/EP93/01254 | 9/1993 | (WO) . |

* cited by examiner

Primary Examiner—A. Michael Chambers
Assistant Examiner—Thomas L. McShane
(74) Attorney, Agent, or Firm—Reising, Ethington, Barnes, Kisselle, Learman & McCulloch, P.C.

(57) ABSTRACT

A stem valve stopper that has a shell (1) intended to be mounted to a faucet (K). An operating stem (8) is mounted for rotation but is axially fixed in the stopper shell (1) and has a lower end that acts as a valve seat surface (12). The stem 8 has an interior section (7) that is threadably engaged with a mobile fitting (6) that is mounted in the shell so that it can be moved axially but cannot be turned or rotated inside the stopper shell. The mobile fitting (6) has an annular lower end surrounding a valve seat (12). A valve sealing member (17) made from elastomeric material is mounted in the lower end of stopper shell (1) and is spring biased downstream toward the valve seat (12). The mobile fitting (6) can be operated to push the sealing member (17) upstream away from valve seat surface (12) and provide flow about the valve seat (12). The valve seat is made from elastomeric material and preferably inside its retaining regions has a hollow space so that, in the closed mode, it is dilated by the pressure of the water to press against the valve seat surface (12).

21 Claims, 3 Drawing Sheets

STEM VALVE STOPPER

TECHNICAL FIELD

This invention relates to a stopper of the rotating screw type, intended to be applied to a cock, tap or faucet to adjust the flow of water between an intake passage and an outlet passage.

BACKGROUND OF THE INVENTION

Rotating screw stoppers have long been used to control the flow through a tap or faucet. The screw has an exterior end mounted to a handle. The screw, commonly in the form of a stem or arbor, is threadably engaged to a housing and mounting a mobile valve seal or washer at the interior end.

As the screw valve is tightened, the washer is compressed against a valve seat. However, the washer by being rotated as it compressed against the valve seat until the stem was fully tightened unduly wore both the washer and the valve seat. While the washer could be replaced, the valve seat could not. Furthermore, the stem rose out of the housing as the valve was opened which many users deemed undesirable. Non-rising stem valves have been developed that use shearing action of a valve seal. However, compressive valves are often still desirable due to the better sealing seating available through compressive action. More non-rising stem valves have been developed that continue to use compressive action of the seal against a fixed valve seat.

A non-rising stem stopper essentially compresses a shell, intended to be affixed securely to the body of a faucet device. A mobile fitting is mounted in an axially movable manner and in a nonrotatable manner inside the shell of the stopper and bearing a valve seal. An operating stem is mounted for rotation and fixed in an axial direction in the shell o the stopper. The stem has one end inside the shell, linked by a screw threading to the mobile fitting, and an outer end that protrudes form the shell of the stopper and constructed to mount an operating handle. Rotation of the handle causes axial shifting of the mobile fitting and the valve seal which, cooperating in a timely fashion with a valve seat placed between the intake passage and the outlet passage of the body of a faucet valve brings about the desired adjustment of the water flow.

Traditionally, the valve seal, supported by the mobile fitting, was made up of a packing disc consisting of elastomeric material. The mount of the inlet passage is formed in the body of a faucet, itself as a valve seat that cooperates with the packing disc to adjust the flow. An example of this traditional arrangement is provided in document DE-U-94 18 554.

With this arrangement, a sealing washer made of elastomeric material was subject to deterioration. After deterioration, the washer can be easily removed by dismantling the shell of the stopper form the body of the set of cocks, taps and valves. Furthermore, the repair was inexpensive. A simple washer with a central hole was attached via a bolt.

However, the valve seat that cooperates with this washer is also subjected to deterioration. Due to the valve seat being a part of the body of a cock, tap or valve, it can be restored only by working on it with a suitable manual milling machine. Such a repair is not an easy operation nor are the results always satisfactory and the repair cannot be repeated more than several times.

An attempt was therefore undertaken to make this valve seat on a separate member that is screwed into the body of the faucet and that can be extracted so that it may be repaired or replaced. Such a modification results in an excessive increase in the cost of the faucet.

Furthermore, the operations involved in disassembly and reassembling the applied valve seat are not easy and require special tools.

An attempt was made to remedy this inconvenience, for example, as disclosed in document EP-B-O 606 419. In this disclosure, the valve seal is a rigid element forming a part of the mobile fitting of the stopper. A special packing made of elastomeric material installed in the shell itself fits tightly against the mount of the intake passage presented by the body of a faucet and which, will cooperate with the rigid vale seal presented by the mobile fitting of the stopper. The body of the faucet is thus protected against any deterioration; but the special necessary packing must have a complex configuration and is therefore expensive. The shell of the stopper also requires relatively expensive processing to manufacture a seat intended to receive such a packing.

According to International Patent Application WO 93/24774, the use of a packing with a complex shape was avoided by installing a first ferrule that forms a ring-shaped shoulder in the end of the body of the stopper with the stop bolt. A second ferrule is installed inside the first one that received a static packing intended to provide a seal against the mouth of the inlet passage of the faucet body. The interior end of the second ferrule holds an elastomeric retaining sealing member by a spring toward the shoulder of the first ferrule. The mobile fitting of the stopper moves axially onto the sealing element for shutting off flows and rises away from the sealing element to an open position. A disadvantage of this arrangement is that two ferrules must be used. Besides the added costs and complexity of two ferrules, the presence of two ferrules adds thickness inside the shell of the stopper. This increased thickness limits the diameter of the elastomeric sealing member and the passage therethrough which in turn restricts the maximum flow volume of the stopper under maximum opening conditions.

Furthermore, in the known stopper constructions, the pressure of the water works on the mobile fitting over a large cross section, giving rise to a relatively powerful force that must be overcome by working the stopper. Furthermore, as the elastomeric sealing member wears out or is crushed, the mobile fitting axially advance an increased distance position to provide the seal in the closed position in turn which entails inconveniences and interferes with the service life of the packing. In addition, the known valve stopper has static packings placed between the shell of the stopper which can yield only to a very limited degree. The distance between the region in which the valve stopper shell is screwed onto the faucet body and the surface of the body against which said static packing must establish a successful seal becomes critical. In some cases, manufacturing here requires compliance with excessively restricted tolerances, which again causes higher costs and gives rise to the possibility of inconveniences due to the heat expansion of the parts.

What is needed is a valve stopper with a non-rising stem so as to be sealed against the body of the faucet with the use of a simply shaped packing and without any need for expensive work on the shell of the stopper. It is further needed to have a packing and that can be easily accessed and replaced when it has worn out or is broken. What is also desired is to increase maximum flow rates of a valve stopper for a given outer dimension and to decrease the total force due to the water pressure against the mobile fitting to reduce the force needed to operate the valve stem. It is also desired to incorporate a device to reduce the noise level connected with any severely restricted flow of water.

It is further desirable to construct such a stopper that may have increased manufacturing tolerances as to the distance between the region in which the stopper is installed in the faucet body and the surface of the body where the seal must be established with the packing seal.

SUMMARY OF THE INVENTION

In accordance with one aspect of the invention, a valve stopper includes a shell constructed to be sealingly securable to a faucet body. An operating arbor is mounted rotatably in the shell of the stopper. An outer end of the arbor protrudes from the shell of the stopper and constructed to mount an operating handle. The arbor has an inner end forming a valve seat surface. Preferably the arbor is mounted only for rotatable motion and is fixed in an axial direction in the shell.

A mobile fitting is mounted in an axially movable fashion inside the shell of the stopper and operably connected with the arbor to move axially as the arbor rotates. The mobile fitting has the shape of an annular jacket surrounding the arbor with radial ports therethrough and can move upstream from the valve seat surface. The annular mobile fitting is preferably non-rotatably fixed with respect to the shell and threadably engaged to the arbor for only axial movement in the shell as the arbor is rotated.

A first annular sealing member cooperates with the valve seat surface on the arbor at one axial end to shut off the valve stopper and constructed to abut against the annular mobile fitting. As the mobile fitting axially moves in the shell upstream toward an open position, the sealing member is moved away from the arbor and unseated from the valve seat surface. The sealing member is resiliently biased to move downstream toward and abut the valve seat surface as the mobile fitting is axially moved toward a closed position.

Preferably the first annular sealing member is housed in a single ferrule. The ferrule has a support seat for seating a biased sealing element and a second seat for seating a static sealing element to provide a sealing connection about a mouth of a passage in the body of the faucet to the inlet in the valve stopper.

In one embodiment, the static sealing element is provided by a second annular sealing member biased in a direction opposite to the bias of the first annular sealing member. Both the first and second annular sealing member are received directly in one end of the shell of the stopper and sealingly abut an inner surface of said shell. Each sealing member is preferably made from elastomeric material biased by a spring. Preferably a single biasing element applies the resilient bias to both the first and second sealing members in opposite directions. In another embodiment, the sealing members are made from rigid material and biased by a spring and provided with a retaining packing. In another embodiment, the sealing members are made from elastomeric material and biased by their own resilient elasticity.

It is desirable that the radial ports in the mobile fitting have respective narrowed passage sections which receive flow under conditions of severe choking. The narrow passages are formed by one of protrusions situated in said radial ports, millings, and small holes in a wall of the mobile fitting.

In accordance with another aspect of the invention, the operating arbor is mounted rotatably in the shell of the stopper. The mobile fitting is mounted in an axially movable fashion inside the shell of the stopper and operably connected with the arbor to move axially as the arbor rotates. An interior valve seating surface is axially affixed in the interior of the shell. The mobile fitting has the shape of an annular jacket surrounding the interior valve seat surface with radial passages therethrough. The annular sealing member is operably connected to an inlet for allowing flow therethrough and has its downstream end sealingly abutted to the valve seating surface. The annular mobile fitting can move the sealing member upstream away from the valve seating surface as it is axially moved to an open position. The sealing member is resiliently biased to move downstream toward and abut the interior valve seat surface as said mobile fitting is axially moved toward a closed position.

BRIEF DESCRIPTION OF THE DRAWINGS

Reference now is made to the accompanying drawings in which.

DETAILED DESCRIPTION OF THE PREFERRED EMBODIMENTS

Figure 1:
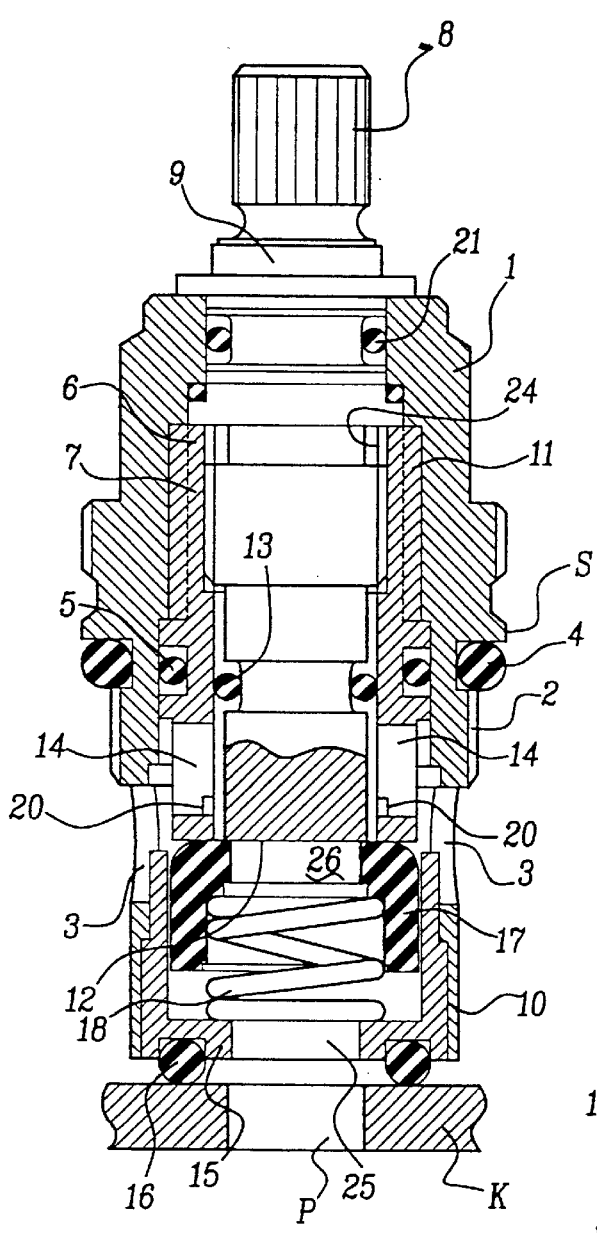
FIG. 1 is a side elevational and segmented view of a valve stopper according to a first embodiment of the invention in the closed position.

Referring now to FIG. 1, a valve stopper has a shell 1 provided with an exterior screw threading 2 for its connection to the body of a faucet (of which the drawing for reasons of clarity only shows the region presenting mouth K of passage P for water intake). The stopper also has peripheral openings 3 for the discharge of water, and a packing 4 to create a tight hold with the body of the faucet. The shell 1 houses a mobile fitting 6 mounted via a splined connection 11 so as to be non-rotatably movable in the axial direction. A packing 5 establishes the seal between shell 1 and mobile fitting 6. In shell 1, there is also housed an operating stem or arbor 9. The stem 9 is mounted for rotation but is affixed in the axial direction. Stem 9 has a threaded internal section 7 that is screwed into a corresponding screw threading 24 of mobile fitting 6 and has an outer end 8 that protrudes from shell 1 and is so arranged as to receive an operating handle (not shown). All of the parts described to far are commonly found in a variety of stem valves and are well known. When operating stem 9 is rotated by means of a handle, the mobile fitting 6 is shifted axially up and down.

In contrast to known designs, stem 9 extends into the inside of the stopper beyond threaded part 7 to form a valve seat 12, and a sealing gasket 13 establishes its seal with respect to mobile fitting 6. In turn, mobile fitting 6 has the shape of an annular jacket and extends around piston 12, presenting radial delivery openings 14.

Figure 2:
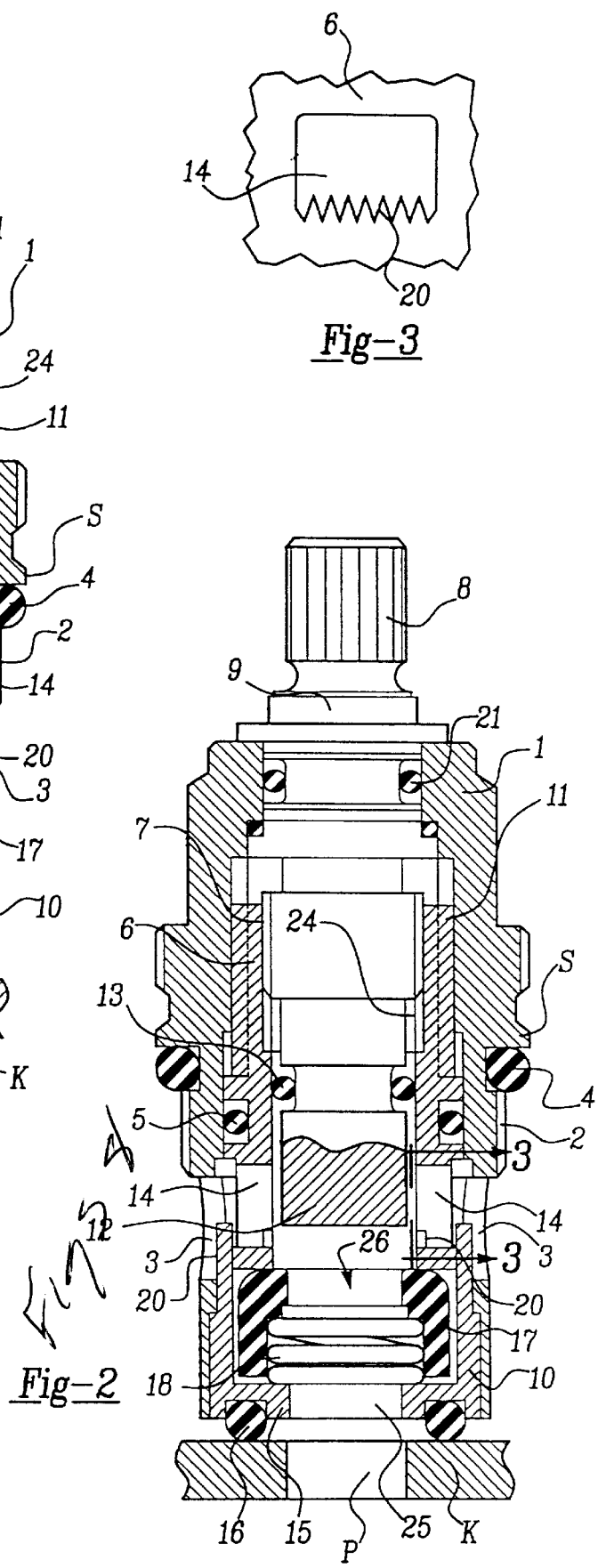
FIG. 2 is a view similar to FIG. 1 illustrating the valve stopper in the open position.

As illustrated in FIGS. 1 and 2, a ferrule 10 made of rigid material is installed in the end of body 1, which is opposite stem 9, there is installed in a fixed manner. The ferrule has a substantially cylindrical downstream end facing toward the inside of the stopper and an outside flange 15 that forms a seat for a static packing 16 that is intended to provide a seal against mouth or nozzle K of passage P for the intake of water from the faucet body. A passage 25 passes through ferrule 10.

An elastomeric annular sealing member 17 is mounted for axial movement in ferrule 10 and which is resiliently biased toward valve seat 12 by a spring 18 which rests against flange 15 of ferrule 10. The stacked thickness of body 1 and of the single ferrule 10 limits the diameter of annular sealing member 17. The annular sealing member 17 can be sized to span the entire inner diameter of the ferrule 10 and have a sized aperture 26 outside will permit a strong flow volume (in the maximum open position as described later).

When the mobile fitting 6 is in the position shown in FIG. 1, that is, in the closed position that is most distant from inlet 25, lifted off of sealing member 17, and lifted above valve seat 12; sealing member 17 is biased by spring 18 and will sealingly abut against valve seat 12. The stopper is therefore in the shut-off or closed position. In this position, the water pressure, acts on the cross-sectional exposed area of sealing member 17 which may exceed the exposed surface area of valve seat 12 thus contributing to maintaining the closure with a force in proportion to the water pressure at passage P.

The valve stem 9, as it rotates, can shift mobile fitting 6 toward sealing member 17 as shown in FIG. 2. Consequently, the mobile fitting 6 will come to rest against the peripheral annular region of sealing member 17 and will push it away from valve seat surface 12. The water comes from inlet passage P through mouth K which is sealed with packing 16. The water then passes through the lower passage 25 in ferrule 10 and through the passage 26 in sealing member 17 and then between member 17 and valve seat 12. The water flows through delivery openings 14 of mobile fitting 6 and finally comes out of shell 1 through its peripheral openings 3 and is passed back into the faucet body in order then to be delivered by it through a spout, showerhead or other nozzle device. The permitted flow volume naturally depends on the distance that the mobile fitting 6 has shifted sealing member 17 from valve seat 12. The flow rate can be adjusted up to a predetermined maximum by rotation of stem 9.

The operation of this stopper offers various advantages, in addition to its structural advantages. The fact that sealing member 17 is shifted during normal operation of the faucet and, hence, frequently, and provides dynamic movement rather than a mere static function thus preventing deposits of limestone between member 17 and its seat, ferrule 10 which can seriously impair successful operation of the valve. The fact that the mobile fitting when moved to press against the elastomeric member 17 is opening the stopper and not, as is customary, closing it is also advantageous. In this way, the stopper remains entirely protected against the possibility, which often happens in known stoppers, that the user might close the stopper with excessive force, which can damage the seals. Furthermore, the fact that valve seat surface 12 rotates with operating stem 9 means that it will periodically exert a polishing action on sealing member 17 further preventing the formation of limestone deposits and expelling any possible small, foreign bodies.

Figure 3:
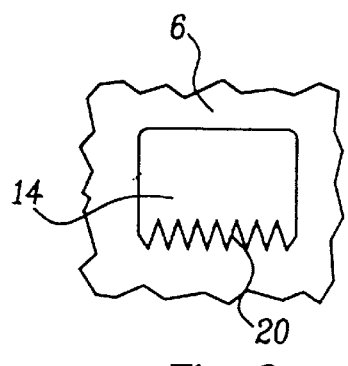
FIG. 3 shows an enlarged detail looking along lines 3—3 in FIG. 2.
Figure 4:
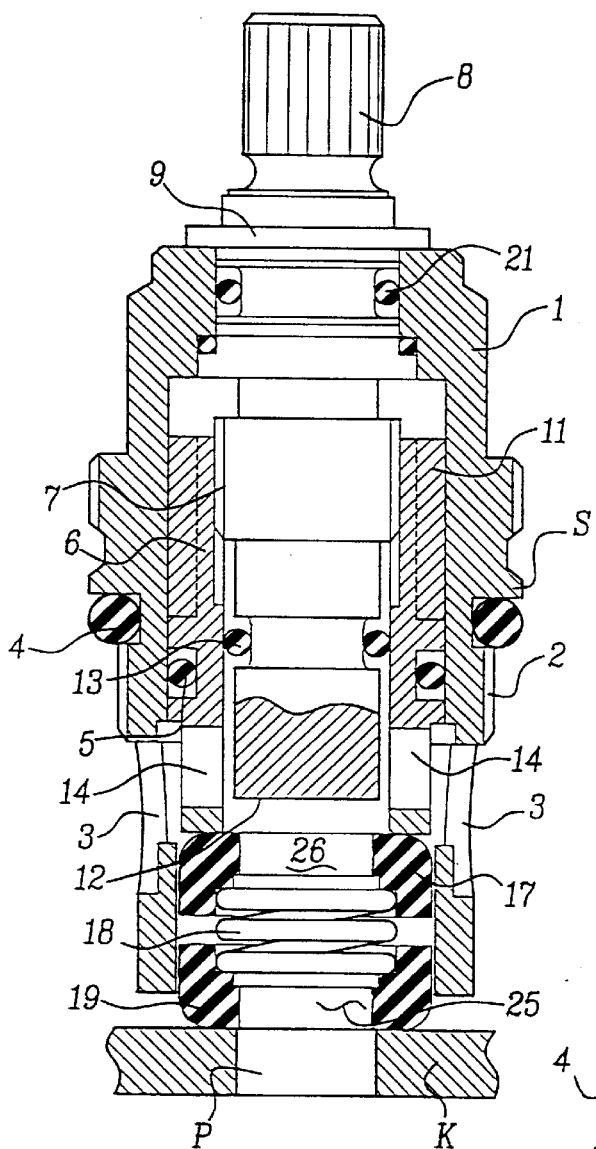
FIG. 4 is a view similar to FIG. 1 illustrating a second embodiment in the closed position.
Figure 5:
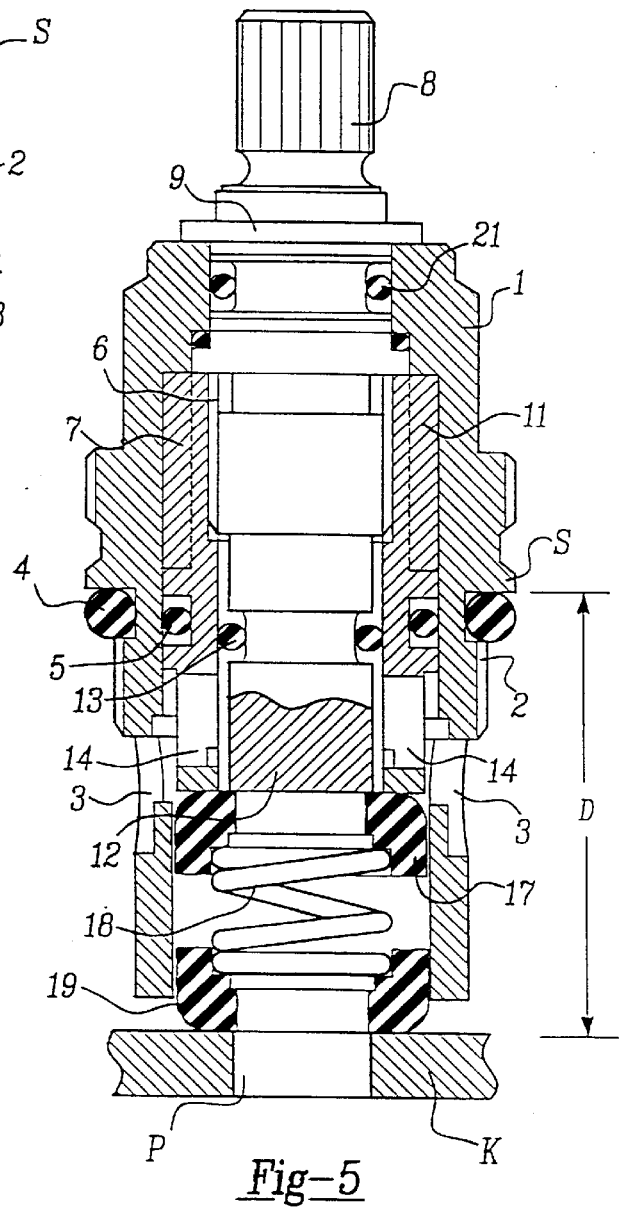
FIG. 5 is a view similar to FIG. 4 illustrating the second embodiment of the invention in the open position.

The described structure is particularly suitable for the introduction of very simple device that can reduce the flow noise which tends to be considerable under conditions of severe restriction which exist at the beginning of the opening and at the end of the closing action. Little teeth or protrusions 20 as clearly shown in FIG. 3 protrude on one side of the delivery openings 14 form narrow passages therebetween. Alternately grills situated in the delivery openings or from millings or small holes made in a wall of the mobile can suffice. Under conditions of severe choking, the flow must thus pass through these narrow passages, causing the flow to slow down and moderate its turbulence and hence its noise level. FIGS. 4 and 5 illustrate another embodiment that avoids the critical nature of the distance between the region in which the valve stopper is screwed into the body of the faucet and the mount surface K of the body of the faucet against which the packing seal must sealingly abut. In these figures and the following figures, the same parts or parts corresponding to those already described for the first embodiment have the same reference numbers and are not described any further.

In this embodiment the ferrule 10 is eliminated as in the first embodiment, and sealing member 17 is received in the end of the shell 1 of the stopper. For this reason, the sealing member 17 in the second embodiment may have an enlarged diameter than the sealing member 17 in the first embodiment, thus allowing an increased maximum flow. There is also provided a second sealing member 19, arranged in an upside-down position with respect to the first sealing member 17 and which can advantageously be biased by the same spring 18 in an opposite direction from sealing member 17. Sealing member 19 thus tends to bias itself out from body 1 of the stopper, and against the body of a faucet to provide a seal against mouth K about intake passage P. In this case, likewise, as in the case of member 17, the seal is established both by the force of the spring 18 and by the pressure of the water, which acts on the internal surface of sealing member 19. Therefore, the seal is established with a force that is in proportion to the water pressure and hence in a particularly secure fashion.

Because sealing member 19 can axially move in body 1 of the stopper, it can accommodate even major differences in distance D. which is effectively present between the region between shoulder S in which the stopper is screwed into the body of the faucet and valves and mouth surface K of the faucet body against which the seal must be established with member 19. This feature also facilitates and allows the valve stopper according to the invention to replace preceding stoppers in faucets and valves in which the distance D can have some varying values.

It is also noted that the effect of the inevitable heat expansions of the parts, which in known design harms the performance of the static packing 16 arranged between the stopper and the faucet body. In this embodiment, the expansion provides an advantageous feature. The repeated expansion produces repeated small movements of sealing member 17 in body 1 of the stopper and thus, by virtue of this effect, also prevents the formation of harmful deposits of limestone. Furthermore, this embodiment allows the sealing members 17,19 to be easily exchanged when they are worn out or damaged by simply unthreading the stopper from body 1 of the stopper and replacing new collars without requiring the use of any tools.

Figure 6:
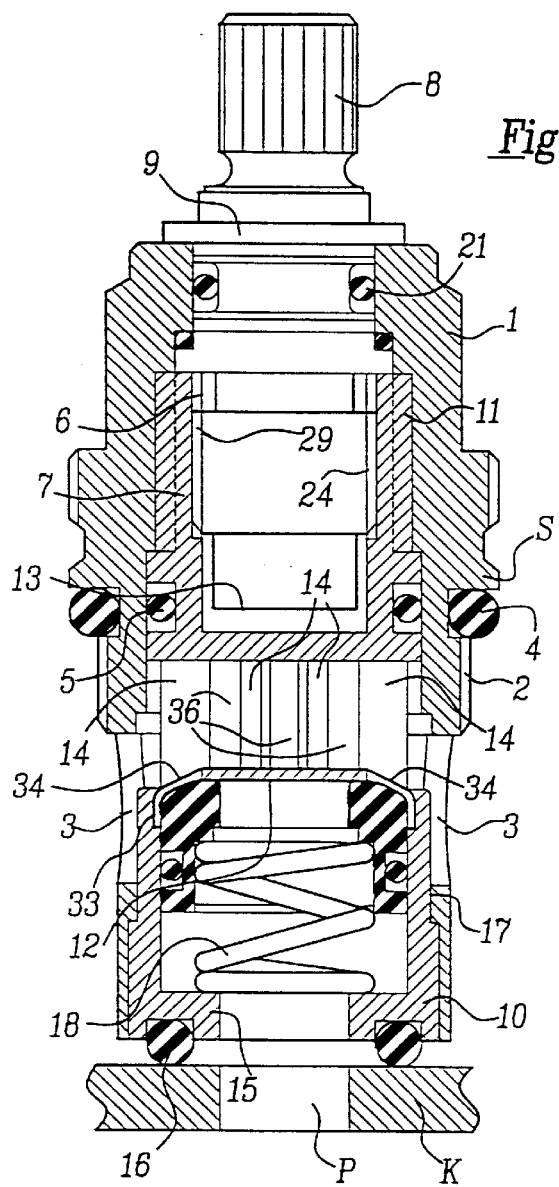
FIG. 6 is a view similar to FIG. 1 illustrating a third embodiment in the closed position.
Figure 7:
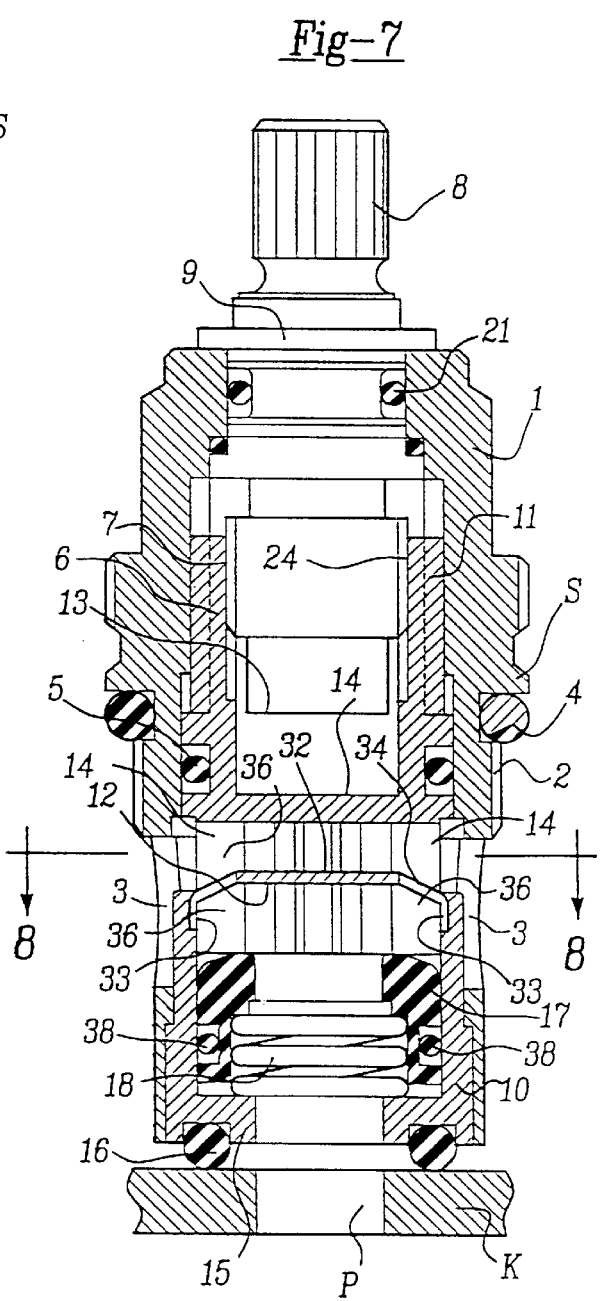
FIG. 7 is a view similar to FIG. 6 illustrating the third embodiment in the open position.
Figure 8:
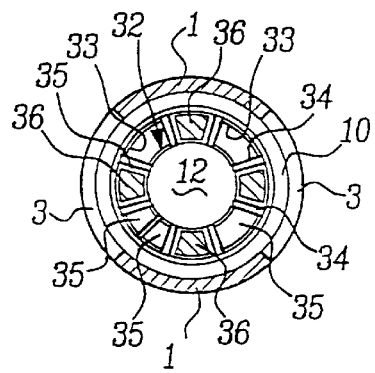
FIG. 8 is a cross sectional view taken along lines 8—8 in FIG. 7.

A third embodiment is disclosed in FIGS. 6–8. In this embodiment the valve seat 12 is not part of the stem 9 but is a cap member 32 secured to the top end of ferrule 10. It may be press fitted or attached via a bayonet or other secure fitting method about its periphery 33. The valve seat 12 is secured in place via radially extending braces 34 extending from seat 12 to periphery 33. Radial vents 35 surround seat 12 between braces 34 as shown in FIG. 8. The mobile fitting 11 has circumferentially positioned fingers 36 extending through some of the vents 35. Radial openings 14 are formed between the fingers 36. The sealing member 17 in this embodiment is made from a rigid material such as ceramic and has a sealing gasket 38 about its periphery abutting the upper surface of ferrule 10.

As shown in FIG. 6, when the mobile fitting 6 is lifted, the sealing member 17 is biased to seal against fixed valve seat 12. As mobile fitting 6 is axially moved downward in the upstream direction, as shown in FIG. 7, the fingers 36 extend through some of the vents 35 and push the sealing member 17 away from fixed valve seat 12. As sealing member 17 moves upstream and away, the water flow passes through vents 35 about valve seat 12 and out through openings 14 and outlets 3.

The stem valve stopper according to the invention thus can attain all or a part of the above stated advantages without any significant increase in its production cost. In particular, the designer can in an optimum fashion adapt the features of the stopper to any special requirements associated with each particular application.

It must be understood that the invention is not restricted to the embodiments described and illustrated by way of example. Some modifications are within the reach of the technician in the field, especially as regards the structure of the sealing member where it can be pushed by its own elasticity. In this latter case, it is also possible to make two sealing members all in one integrated piece with a single intermediate region, for example, in the form of bellows, acting as elastic member for both. Arrangements intended to silence the flow of the stopper can also be varied and, where a second sealing member is used to work against a surface of the set of taps and valves, one may adopt arrangements to prevent the members 17 and 19 from coming out completely, except when they must be replaced.

Other variations are foreseen without departing from the spirit and scope of the invention as defined in the appended claims.

I claim:

1. A valve stopper includes a shell constructed to be sealingly securable to a faucet body; an operating arbor mounted rotatably in said shell of the stopper a mobile fitting mounted in an axially movable fashion inside said shell of the stopper and operably connected with said arbor to move axially as said arbor rotates; and an outer end of said arbor protruding from the shell of the stopper and constructed to mount an operating handle, said valve stopper characterized by:
    said arbor having an inner end forming a valve seat surface;
    said mobile fitting having the shape of an annular jacket with radial ports therethrough;
    a first annular sealing member cooperating with the valve seat surface on said arbor at one axial end, constructed to abut against the annular mobile fitting, being movable away from said arbor by said mobile fitting as said annular sealing surface is axially moved to an open position, and resiliently biased to move toward said valve seat surface as said mobile fitting is moved toward a closed position.

2. A valve stopper as defined in claim 1 further characterized by:
    said operative arbor mounted only for rotatable motion and fixed in an axial direction in said shell;
    said annular mobile fitting is non-rotatably fixed in said shell and threadably engaged to said arbor for axial movement as said arbor is rotated.

3. A valve stopper as defined in claim 2 further characterized by:
    said first annular sealing member is housed in a single ferrule, said ferrule having a support seat for seating a bias element and seating a static sealing element to provide a seal about a mouth of an inlet passage in the body of the faucet.

4. A valve stopper as defined in claim 2 further characterized by:
    a second annular sealing member biased in a direction opposite to the bias of the first annular sealing member to provide a static seal about a mouth of an inlet passage in the body of the faucet.

5. A valve stopper as defined in claim 4 further characterized by:
    a single biasing element applying the resilient bias to both first and second sealing members in opposite directions.

6. A valve stopper as defined in claim 5, further characterized by:
    both first and second annular sealing members being received directly in one end of the shell of the stopper and sealingly abutting an inner surface of said shell.

7. A valve stopper as defined in claim 4, further characterized by:
    said sealing members being made from elastomeric material biased by a spring.

8. A valve stopper as defined in claim 4, further characterized by:
    said sealing members being made from rigid material and biased by a spring and provided with a retaining packing.

9. A valve stopper as defined in claim 4, further characterized by:
    said sealing members being made from elastomeric material and biased by their own resilient elasticity.

10. A valve stopper as defined in claim 9, further characterized by:
    the two sealing members being integrally formed from elastomeric material, with an intermediate interposed biasing section therebetween that biases both sealing members in said opposite directions.

11. A valve stopper as defined in claim 1, further characterized by:
    the radial ports of said mobile fitting have respective narrowed passage sections which receive flow under conditions of severe choking.

12. A valve stopper as defined in claim 11 further characterized by:
    said narrow passages are formed by one of protrusions situated in said delivery openings, millings, and small holes in a wall of the mobile fitting.

13. A valve stopper as defined in claim 1 further characterized by:
    a second annular sealing member biased in a direction opposite to the bias of the first annular sealing member to provide a static seal about a mouth of an inlet passage in the body of the faucet.

14. A valve stopper as defined in claim 13 further characterized by:
    a single biasing element applying the resilient bias to both first and second sealing members in opposite directions.

15. A valve stopper as defined in claim 14, further characterized by:

both first and second annular sealing members being received directly in one end of the shell of the stopper and sealingly abutting an inner surface of said shell.

16. A valve stopper as defined in claim 13, further characterized by:

said sealing members being made from elastomeric material biased by a spring.

17. A valve stopper as defined in claim 13, further characterized by:

said sealing members being made from rigid material and biased by a spring and provided with a retaining packing.

18. A valve stopper as defined in claim 13, further characterized by:

said sealing members being formed from elastomeric material and biased by their own resilient elasticity.

19. A valve stopper as defined in claim 18, further characterized by:

the two sealing members being integrally formed from elastomeric material, with an intermediate biasing section interposed therebetween that biases both sealing members in said opposite directions.

20. A valve stopper includes a shell constructed to be sealingly securable to a faucet body; an operating arbor mounted rotatably in said shell of the stopper, a mobile fitting mounted in an axially movable fashion inside said shell of the stopper and operably connected with said arbor to move axially as said arbor rotates; and an outer end of said arbor protruding from the shell of the stopper and constructed to mount an operating handle, said valve stopper characterized by:

an interior valve seat surface axially affixed in the interior of said shell;

said mobile fitting having the shape of an annular jacket surrounding said interior valve seat surface with radial passages therethrough; and an annular sealing member constructed for allowing flow therethrough and having its downstream end cooperating with said valve seat surface;

the annular mobile fitting abuttable against said annular sealing member to move said sealing member upstream and away from said valve seating surface as the mobile fitting is axially moved upstream to an open position; and said sealing member resiliently biased to move downstream toward and to abut said valve seat surface as said mobile fitting is axially moved downstream toward a closed position.

21. A valve stopper as defined in claim 20 further characterized by:

said sealing member, slidably mounted in a ferrule between said fixed interior axially affixed valve seat surface and a sealing gasket that seals said shell about an inlet mouth in said shell.

\* \* \* \* \*